United States Patent
Lancioni et al.

(10) Patent No.: US 11,539,738 B1
(45) Date of Patent: Dec. 27, 2022

(54) METHODS, SYSTEMS, AND MEDIA FOR MITIGATING DAMAGE RESULTING FROM A WEBSITE BEING AN INTERMEDIARY IN A CYBERATTACK

(71) Applicant: McAfee, LLC, Santa Clara, CA (US)

(72) Inventors: German Lancioni, San Jose, CA (US); Joseph Padron, Hometown, IL (US)

(73) Assignee: McAfee, LLC, San Jose, CA (US)

( * ) Notice: Subject to any disclaimer, the term of this patent is extended or adjusted under 35 U.S.C. 154(b) by 212 days.

(21) Appl. No.: 16/828,362

(22) Filed: Mar. 24, 2020

(51) Int. Cl.
*H04L 9/40* (2022.01)

(52) U.S. Cl.
CPC ...... *H04L 63/1441* (2013.01); *H04L 63/0209* (2013.01); *H04L 63/1416* (2013.01); *H04L 63/1433* (2013.01); *H04L 63/20* (2013.01)

(58) Field of Classification Search
CPC .......... H04L 63/1441; H04L 63/0209; H04L 63/1416; H04L 63/1433; H04L 63/20
USPC ....................................... 726/22, 23, 24, 25
See application file for complete search history.

(56) References Cited

U.S. PATENT DOCUMENTS

| | | | | |
|---|---|---|---|---|
| 7,559,085 B1 * | 7/2009 | Wahl | .................... | H04L 63/1441 726/17 |
| 9,148,445 B2 * | 9/2015 | Smith | .................... | G06F 21/554 |
| 2008/0320567 A1 * | 12/2008 | Shulman | ............. | H04L 63/1441 726/4 |
| 2010/0199345 A1 * | 8/2010 | Nadir | ...................... | H04L 63/14 726/22 |
| 2014/0215605 A1 * | 7/2014 | Decime | ............... | H04L 63/1441 726/22 |
| 2016/0127409 A1 * | 5/2016 | Wurth | ..................... | H04L 67/06 726/25 |
| 2016/0142429 A1 * | 5/2016 | Renteria | ............. | H04L 63/1416 726/23 |
| 2016/0248797 A1 * | 8/2016 | Yampolskiy | ........ | H04L 61/2076 |
| 2016/0381060 A1 * | 12/2016 | Floering | ............. | H04L 61/1511 726/25 |
| 2016/0381061 A1 * | 12/2016 | Vanunu | ............... | H04L 63/1433 726/25 |
| 2017/0277891 A1 * | 9/2017 | Keppler | ................ | G06F 21/577 |
| 2017/0279823 A1 * | 9/2017 | Lin | ...................... | H04L 63/0236 |
| 2017/0353496 A1 * | 12/2017 | Pai | ...................... | H04L 63/1441 |
| 2018/0115585 A1 * | 4/2018 | Rubakha | ............... | H04L 63/105 |

* cited by examiner

*Primary Examiner* — Teshome Hailu
(74) *Attorney, Agent, or Firm* — Byrne Poh LLP

(57) ABSTRACT

Mechanisms for mitigating damage resulting from a website being an intermediary in a cyberattack, comprising: detecting a domain name server query made to the website; making a request to the website; receiving a header in response to the request; inspecting the header to identify a software stack component of the website; cross-referencing the software stack component to a common vulnerabilities and exposures (CVE) database to identify a CVE that applies to the software stack component; applying a rule to determine the impact of the CVE on whether the website is a possible intermediary in a cyberattack; determining that the website is a possible intermediary in a cyberattack; and taking action on the website to mitigate damage resulting from the website being an intermediary in a cyberattack.

18 Claims, 7 Drawing Sheets

METHODS, SYSTEMS, AND MEDIA FOR MITIGATING DAMAGE RESULTING FROM A WEBSITE BEING AN INTERMEDIARY IN A CYBERATTACK

BACKGROUND

In an example of a cybersecurity watering hole attack, a bad actor infiltrates a target environment, such as a network of a company, by: infiltrating a vulnerable website accessed by authorized users of the target environment (such as employees of the company); then using the website (once infiltrated) to infiltrate endpoints of the authorized users; and then using the endpoints of the authorized users to access other targets in the target environment.

More particularly, for example, as shown in FIG. 1, a bad actor 102 may initially profile certain employees of a company having a target environment 108 to find out what websites and/or services the employees usually consume. For example, the bad actor may determine that employees of the company frequently visit a certain blog website (e.g., a cybersecurity news blog website 104), use a travel website to book travel, access a certain payroll service website to view pay stubs, etc. Based on this profiling, the bad actor may then analyze one or more of the websites visited by the employees to determine which are weak and/or vulnerable. For example, at 120, the bad actor may determine that a common vulnerabilities and exposures (CVE) entry 112 (e.g., CVE-2018-9207) identifies a vulnerability in a plugin 114 (e.g., jquery-upload-file 4.0.2) that has been identified (at 122) as being used in blog website 104. When the bad actor finds a weak and/or vulnerable website, the bad actor may then compromise the website at 124 by injecting malicious code, hosting malware, infecting existing/trusted downloads, or configuring a redirect of traffic from the employees to a bait site that is configured to steal credentials. Once the website has been compromised, the website becomes a "watering hole" because it can be used to lure the employees to a threat. The bad actor may then wait to be alerted at 126 that an employee of the target organization has visited the website and been infected with malware, had their credentials stolen, etc. at 128. Sometimes this may require some sort of interaction, such as the employee using a file upload form, downloading a previously trusted PDF report, or attempting to login on a phishing site after a redirection from the legitimate one. Finally, the bad actor may access the employee's endpoint 106 at 130 and then move laterally from the infected employee endpoint to the desired final target(s) 110 at 132.

Accordingly, mechanisms for mitigating damage resulting from a website being an intermediary in a cyberattack are desirable.

SUMMARY

In accordance with some embodiments, methods, systems, and media for mitigating damage resulting from a website being an intermediary in a cyberattack are provided.

In some embodiments, methods for mitigating damage resulting from a website being an intermediary in a cyberattack are provided, the methods comprising: detecting a domain name server query made to the website using a hardware processor; making a request to the website; receiving a header in response to the request; inspecting the header to identify a software stack component of the website; cross-referencing the software stack component to a common vulnerabilities and exposures (CVE) database to identify a CVE that applies to the software stack component; applying a rule to determine the impact of the CVE on whether the website is a possible intermediary in a cyberattack; determining that the website is a possible intermediary in a cyberattack; and taking action on the website to mitigate damage resulting from the website being an intermediary in a cyberattack. In some of the methods, the software stack component is one of a web server used by the website, a web framework used by the website, a programming language used by the website, and a web application firewall used by the website. In some of the methods, the methods further comprise identifying content management systems associated with the website. In some of the methods, the methods further comprise calculating a score that reflects a probability that the website is a possible intermediary in a cyberattack. In some of the methods, the methods further comprise limiting operations that can be performed by users on the website. In some of the methods, the methods further comprise blocking the website.

In some embodiments, systems for mitigating damage resulting from a website being an intermediary in a cyberattack are provided, the systems comprising: memory; and a hardware processor coupled to the memory and configured to: detect a domain name server query made to the website; make a request to the website; receive a header in response to the request; inspect the header to identify a software stack component of the website; cross-reference the software stack component to a common vulnerabilities and exposures (CVE) database to identify a CVE that applies to the software stack component; apply a rule to determine the impact of the CVE on whether the website is a possible intermediary in a cyberattack; determine that the website is a possible intermediary in a cyberattack; and take action on the website to mitigate damage resulting from the website being an intermediary in a cyberattack. In some of the systems, the software stack component is one of a web server used by the website, a web framework used by the website, a programming language used by the website, and a web application firewall used by the website. In some of the systems, the hardware processor is further configured to identify content management systems associated with the website. In some of the systems, the hardware processor is further configured to calculate a score that reflects a probability that the website is a possible intermediary in a cyberattack. In some of the systems, the hardware processor is further configured to limit operations that can be performed by users on the website. In some of the systems, the hardware processor is further configured to block the website.

In some embodiments, non-transitory computer readable media containing computer executable instructions that, when executed by a processor, cause the processor to perform a method of mitigating damage resulting from a website being an intermediary in a cyberattack are provided, the method comprising: detecting a domain name server query made to the website; making a request to the website; receiving a header in response to the request; inspecting the header to identify a software stack component of the website; cross-referencing the software stack component to a common vulnerabilities and exposures (CVE) database to identify a CVE that applies to the software stack component; applying a rule to determine the impact of the CVE on whether the website is a possible intermediary in a cyberattack; determining that the website is a possible intermediary in a cyberattack; and taking action on the website to mitigate damage resulting from the website being an intermediary in a cyberattack. In some of the non-transitory computer readable media, the software stack component is one of a web server used by the website, a web framework used by the website, a programming language used by the website, and a web application firewall used by the website. In some of the non-transitory computer readable media, the method further comprises identifying content management systems associated with the website. In some of the non-transitory computer readable media, the method further comprises calculating a score that reflects a probability that the website is a possible intermediary in a cyberattack. In some of the non-transitory computer readable media, the method further comprises operations that can be performed by users on the website. In some of the non-transitory computer readable media, the method further comprises blocking the website.

DETAILED DESCRIPTION

In accordance with some embodiments, mechanisms (which can include systems, methods, and media) for countering watering hole attacks are provided. In some embodiments, these mechanisms can counter watering hole attacks by: (1) monitoring domain name server (DNS) queries to identify websites; (2) scanning websites to identify characteristics of the websites; (3) cross-checking the characteristics of the websites with one or more databases of CVEs; (4) identifying which CVEs are relevant based on a set of rules; (5) computing a likelihood score for each of the one or more websites indicating the likelihood that the website may be used as a watering hole; and (6) take action to prevent or mitigate damage due to possibility of each of the one or more websites being used as a watering hole.

Figure 1:
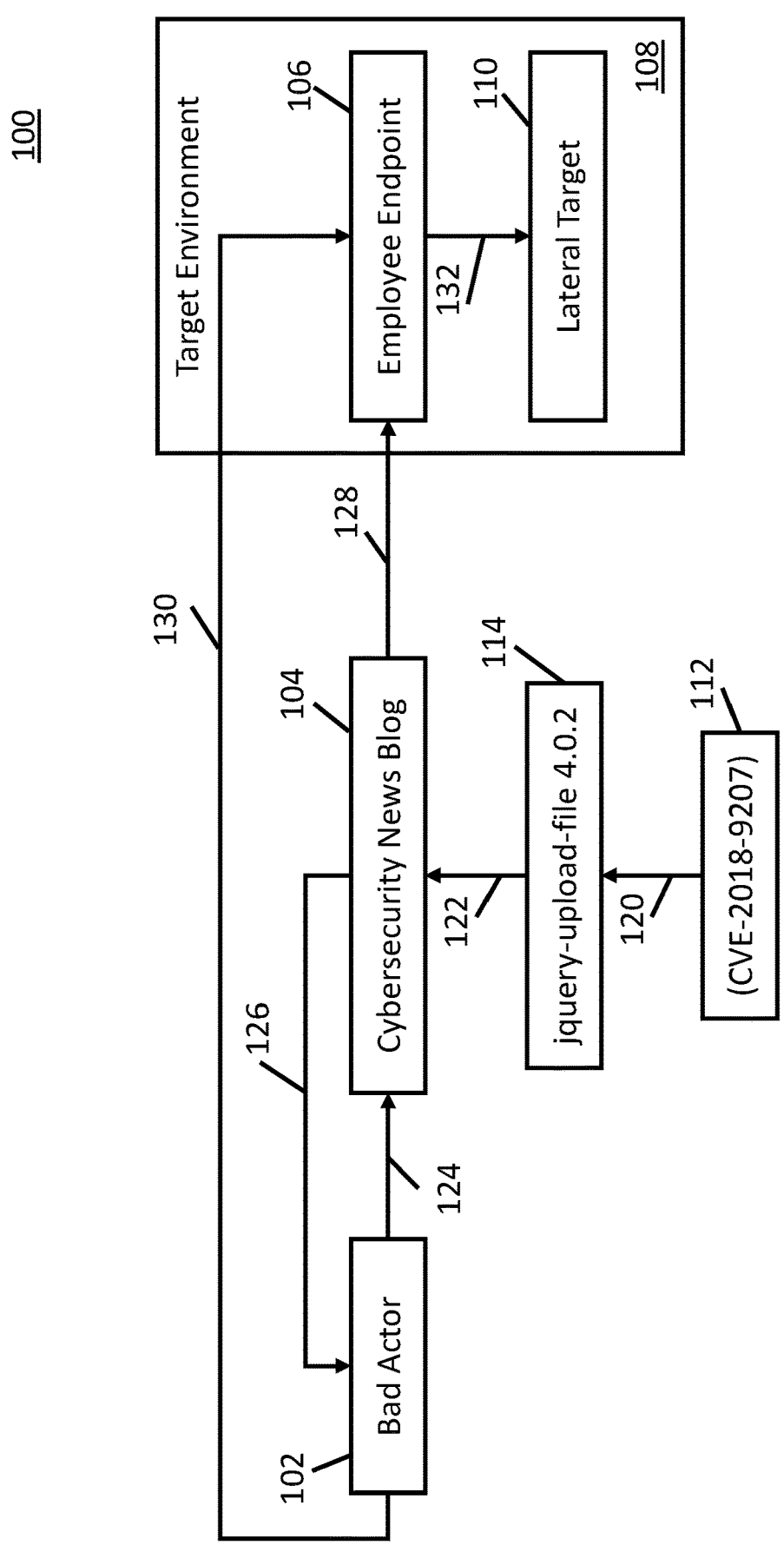
FIG. 1 shows an example of flow diagram for performing a watering hole attack in accordance with the prior art.
Figure 2:
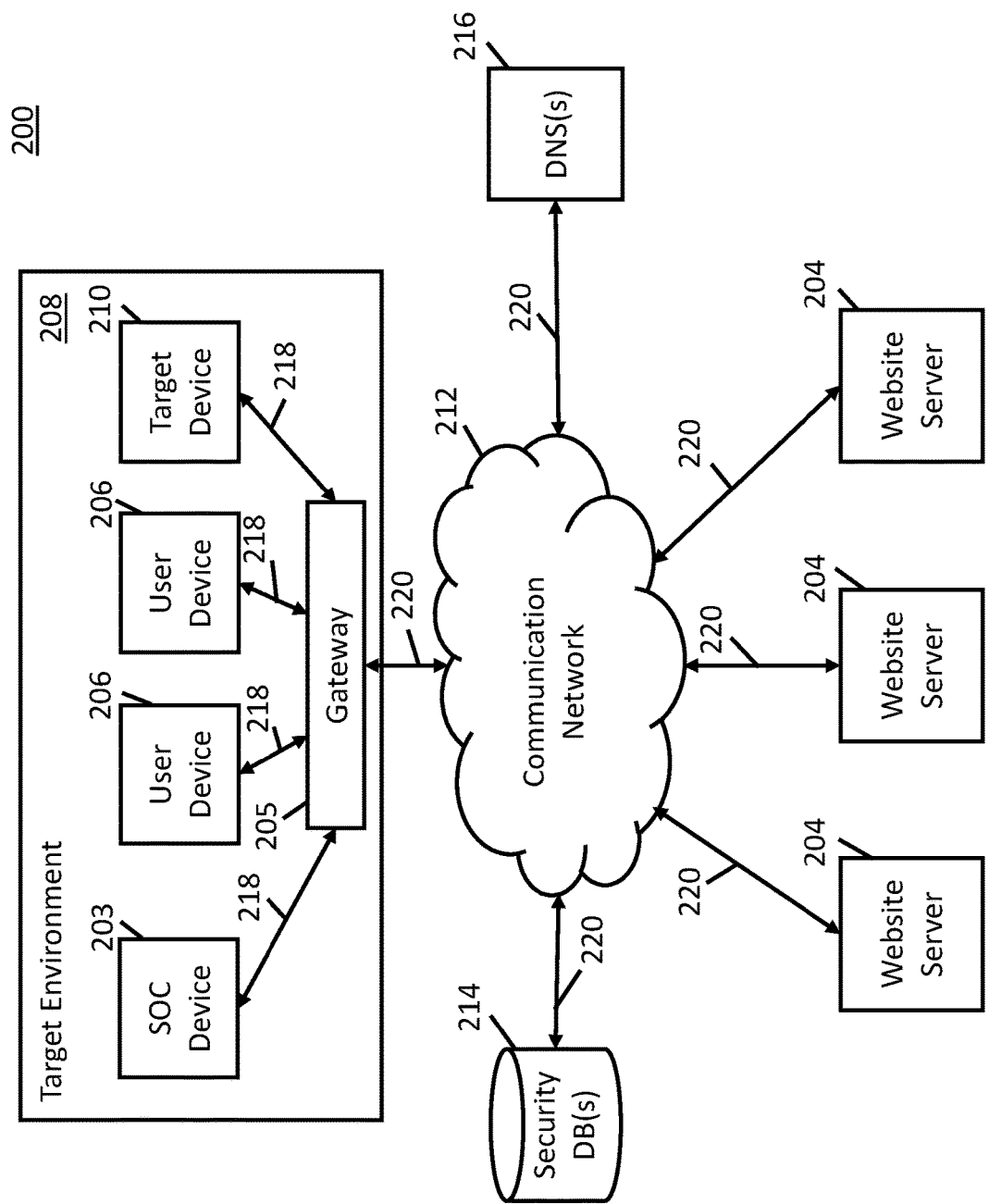
FIG. 2 shows an example of hardware that can be used in accordance with some embodiments.

Turning to FIG. 2, an example 200 of hardware that can be used in accordance with some embodiments of the disclosed subject matter is shown. As illustrated, hardware 200 can include a target environment 208, one or more security databases (DB(s)) 214, a communication network 212, one or more domain name servers (DNS(s)) 216, and a plurality of website servers 204. As also shown in FIG. 2, in some embodiments, target environment 208 can include a security operations center (SOC) device 203, user devices 206, a target device 210 and a gateway 205.

Although particular numbers of particular devices are illustrated in FIG. 2, any suitable number(s) (including zero) of each device shown, and any suitable additional or alternative devices, can be used in some embodiments. For example, one or more additional devices, such as servers, computers, routers, networks, printers, etc., can be included in target environment 208 in some embodiments.

SOC device 203 can be any suitable one or more devices used in an SOC for protecting target environment 208 from threats (such as malware, intrusion attempts, phishing, etc.) in some embodiments. In some embodiments, SOC device 203 can perform one or more of the processes illustrated in and described in connection with FIGS. 4, 5A, and 5B. In some embodiments, SOC device 203 can present the user interface shown in FIG. 6.

User devices 206 can be any suitable user devices used in target environment 208 in some embodiments. For example, in some embodiments, user devices 206 can be desktop computers, laptop computers, tablet computers, smart phones, and/or any other suitable user device(s).

Target device 210 can be any suitable device used in target environment 208 that may be of interest to a bad actor in some embodiments. For example, in some embodiments, target device 206 can be a desktop computer, a laptop computer, a tablet computer, a smart phone, a server, a database, and/or any other suitable device.

Gateway 205 can be any suitable device for connecting other devices in target environment 208 (such as SOC device 203, user devices 206, and target device 210) to devices and/or networks outside target environment 208 in some embodiments. In some embodiments, gateway 205 can monitor traffic passing through it in any direction. In some embodiments, gateway 205 may provide a firewall function, a routing function, and/or any other suitable function.

SOC device 203, user devices 206, and target device 210 can be connected by one or more communications links 218 to gateway 205 in some embodiments. The communications links can be any communications links suitable for communicating data among SOC device 203, user devices 206, and target device 210 and gateway 205, such as network links, dial-up links, wireless links, hard-wired links, routers, switches, any other suitable communications links, or any suitable combination of such links, in some embodiments.

Together, the components of target environment 208 can be considered to make up a local area network (LAN), in some embodiments.

Communication network 212 can be any suitable combination of one or more wired and/or wireless networks in some embodiments. For example, in some embodiments, communication network 212 can include any one or more of the Internet, a mobile data network, a satellite network, a local area network, a wide area network, a telephone network, a cable television network, a WiFi network, a WiMax network, and/or any other suitable communication network.

In some embodiments, communication network 212 and the devices connected to it can form or be part of a wide area network (WAN).

Security database(s) 214 can be any suitable one or more databases for storing security related information about websites, software, threats, etc. For example, in some embodiments, security database(s) 214 can store CVE entries. Security database(s) 214 can include any one or more of the databases described below in connection with FIGS. 5A and 5B.

Domain name server(s) 216 can be any suitable one or more servers for storing domain name, URL, and internet protocol (IP) address information for websites 204.

Website servers 204 can be any suitable servers for hosting websites and/or provide functions related to websites.

Gateway 205, security database(s) 214, domain name server(s) 216, and website servers 204 can be connected by one or more communications links 220 to communication network 212. These communications links can be any communications links suitable for communicating data among gateway 205, security database(s) 214, domain name server(s) 216, website servers 204, and communication network 212, such as network links, dial-up links, wireless links, hard-wired links, routers, switches, any other suitable communications links, or any suitable combination of such links.

Figure 3:
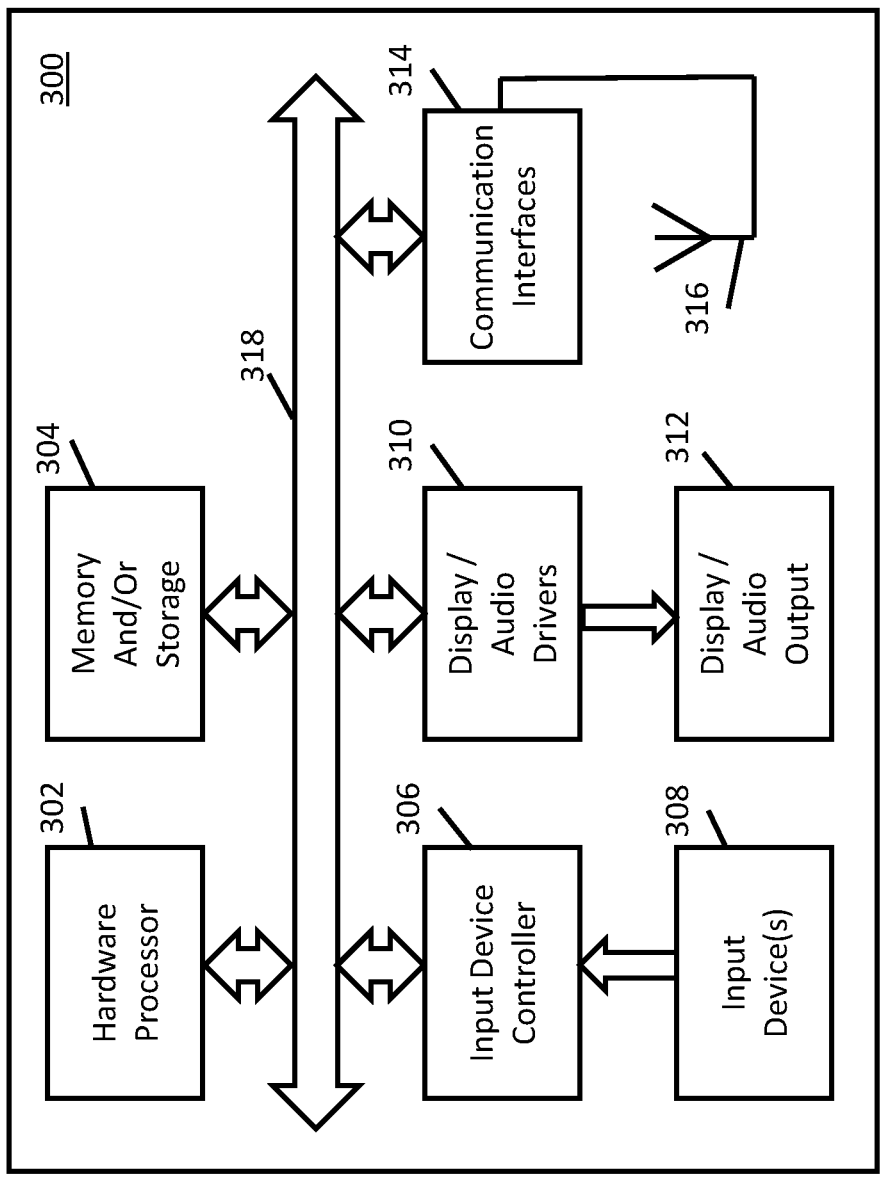
FIG. 3 shows an example of more particular hardware that can be used for certain of the components shown in FIG. 2 in accordance with some embodiments.

SOC device 203, user devices 206, target device 210, gateway 205, security database(s) 214, domain name server(s) 216, and website servers 204 can be implemented using any suitable hardware in some embodiments. For example, in some embodiments, SOC device 203, user devices 206, target device 210, gateway 205, security database(s) 214, domain name server(s) 216, and website servers 204 can be implemented using any suitable general-purpose computer or special-purpose computer(s). For example, gateway 205 can be implemented using a special-purpose computer. Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from input device(s) 308 in some embodiments. For example, input device controller 306 can be circuitry for receiving input from an input device 308, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving one or more display/audio output circuitries 312, such as an LCD display, a speaker, an LED, or any other type of output device.

Communication interface(s) 314 can be any suitable circuitry for interfacing with one or more communication networks, such as network 212 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can additionally or alternatively be included in hardware 300 in accordance with some embodiments.

Figure 4:
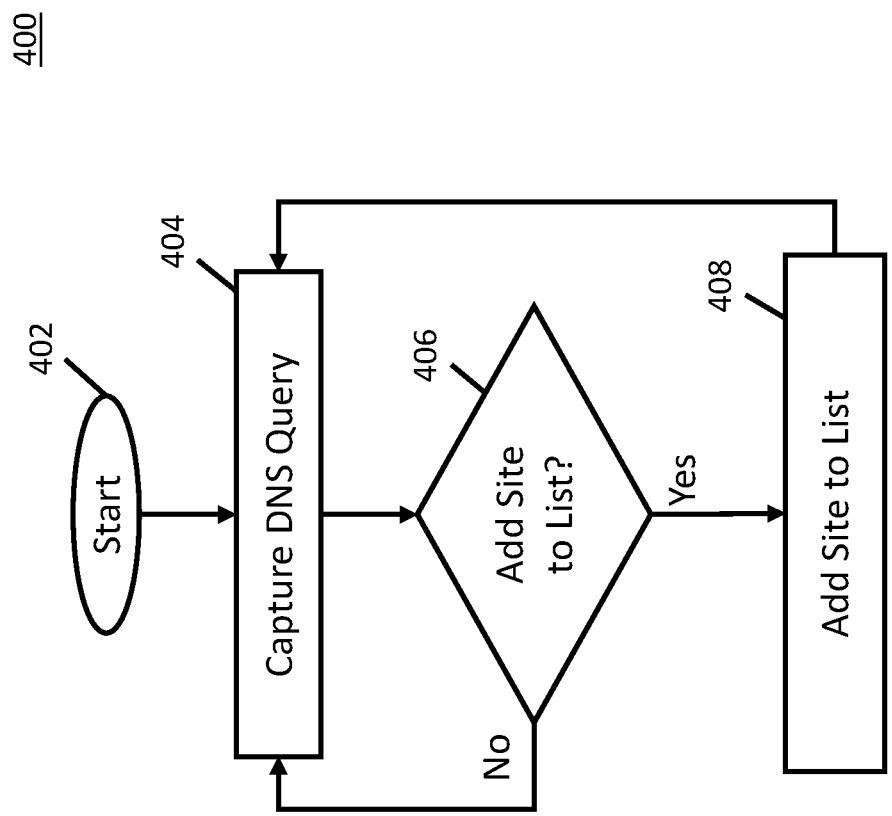
FIG. 4 shows an example of a process for adding websites to a list of websites to be monitored in accordance with some embodiments.

Turning to FIG. 4, an example 400 of a process for creating a list of websites to be monitored is shown in accordance with some embodiments.

As illustrated, after process 400 begins at 402, the process can capture a DNS query at 404. This DNS query can be captured in any suitable manner. For example, in some embodiments, the DNS query can be captured by gateway 205 (FIG. 2) monitor traffic passing through the gateway for DNS queries and extracting the contents thereof when DNS queries to websites are detected.

Next, at 406, process 400 can determine whether to add the website to a list of websites to be monitored. This determination can be determined in any suitable manner. For example, in some embodiment, process 400 can determine that only websites that are specifically request by users are to be included and that servers used for analytics and/or background services are not to be included in some embodiments.

If it is determined at 406 that a website is to be added to the list, then, at 408, process 400 can add the website to the list. Otherwise, or after adding the website to the list, process 400 can loop back to 404.

Figure 5A:
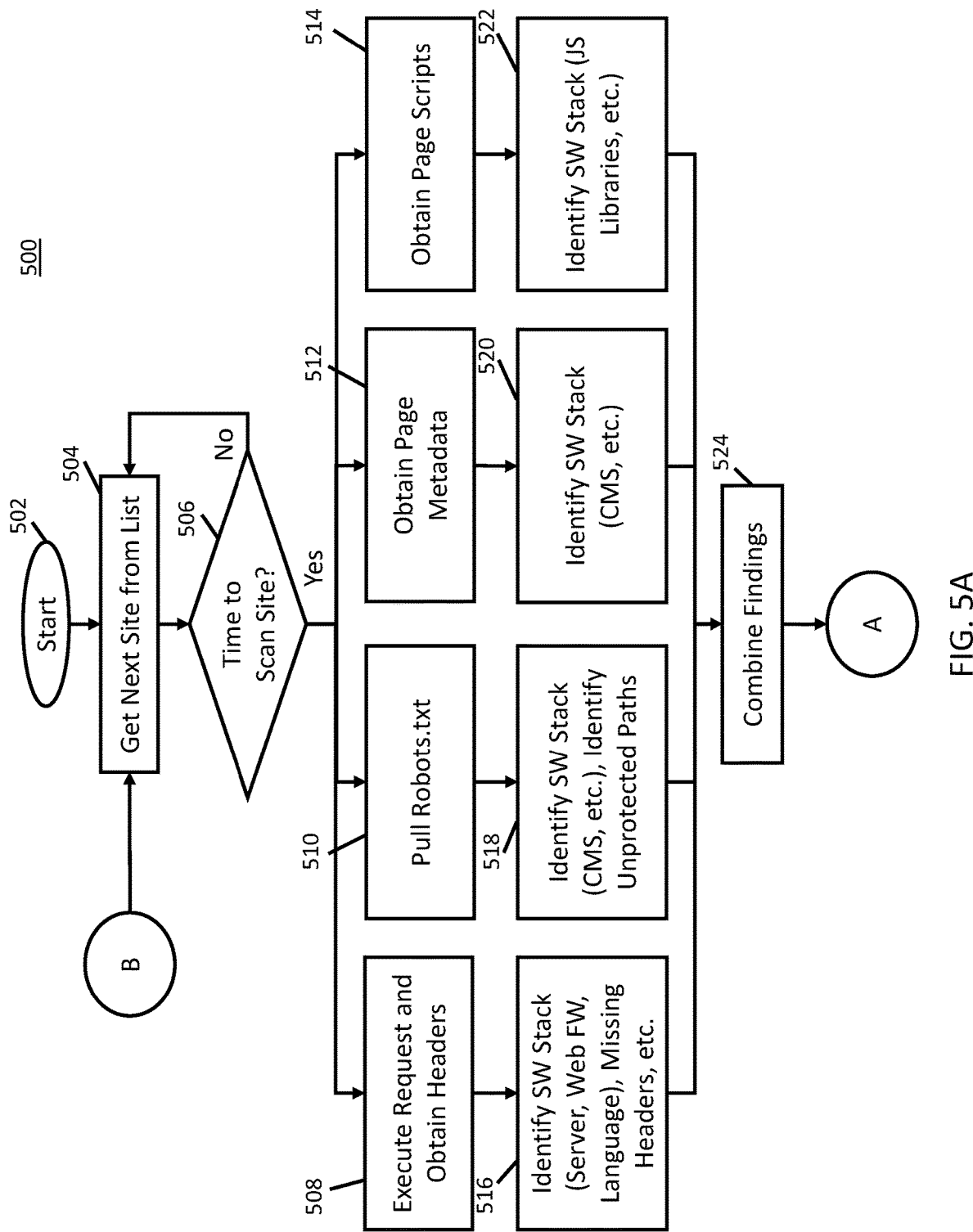
FIGS. 5A-5B show an example of a process for monitoring websites in the list created in process illustrated in FIG. 4 and taking action on the websites when needed in accordance with some embodiments.
Figure 5B:
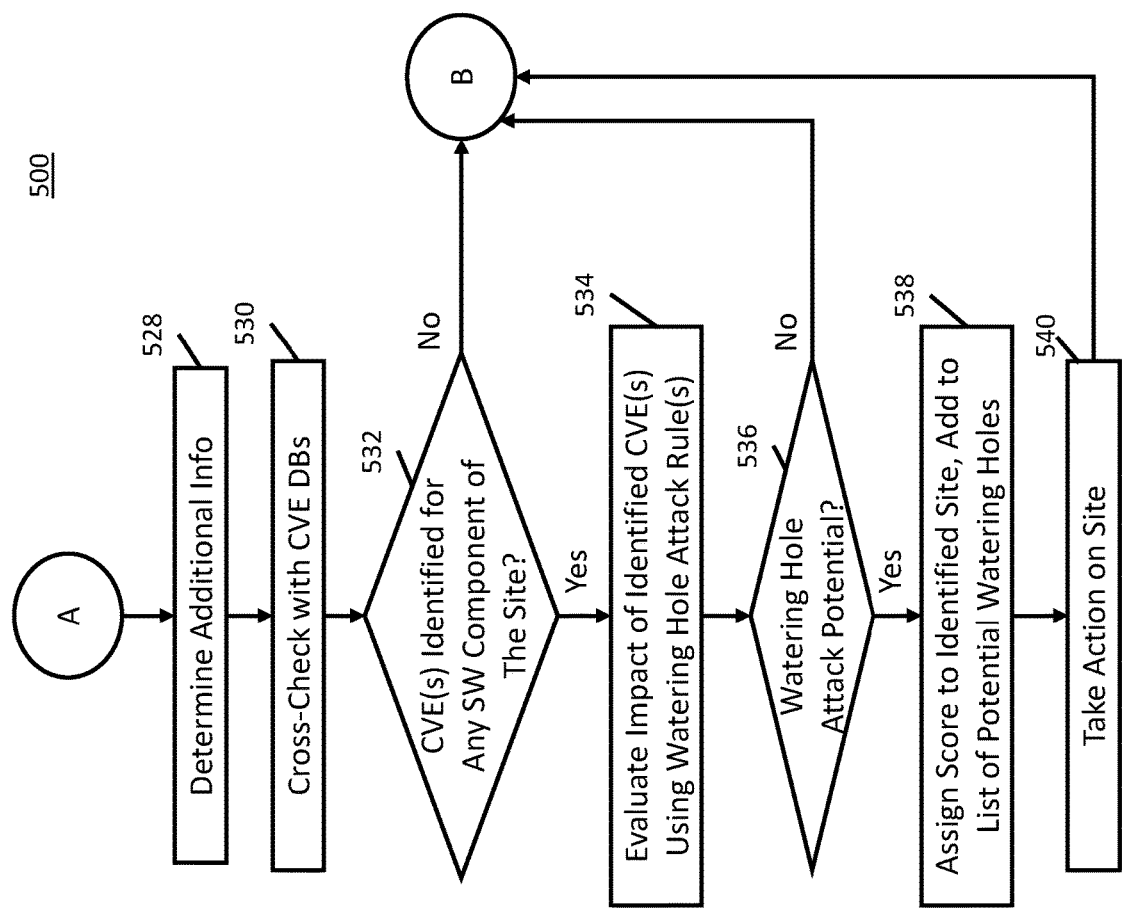

FIGS. 5A and 5B show an example 500 of a process for monitoring websites in the list created in process 400 and taking action on the websites when needed in accordance with some embodiments.

As shown in FIG. 5A, once process 500 has begun at 502, the process can get the next website from the list created by process 400 in some embodiments. The next website can be any suitable website in the list. For example, the next website can be the website in the list following the last scanned website in some embodiments.

Then, at 506, process 500 can determine whether it is time to scan the website selected at 504. This determination can be made in any suitable manner in some embodiments. For example, in some embodiments, process 500 can determine that it is time to scan the website if the website has never been scanned before or if a certain amount of time (e.g., an hour, a day, a week, a month, or any other suitable period of time) has passed since the website was last scanned.

If process 500 determines that it is not time to scan the website, then the process can loop back to 504. Otherwise, process 500 can perform one or more of the scans described in 508 and 516, 510 and 518, 512 and 520, and 514 and 522, in some embodiments. In some embodiments, additional or alternative scans can be performed in some embodiments. In some embodiments, any number of the scans can be performed partially or entirely in series and/or in parallel.

As shown in 508 and 516, in one type of scan, process 500 can execute a request to the website, obtain headers in response, and inspect the headers in some embodiments. More particularly, in some embodiments, a raw request can be made to the website and the returned headers can then be inspected to identify low level software stack components used, such as the web server and web framework used, the programming language behind the server, if the server is configured with a security solution such as a web application firewall, and/or any other security related information that can be derived from the return headers. In some embodiments, this scan can detect any potential security issue regarding headers, such as uncommon header keys (e.g.

keys that are disclosing sensitive information, or letting the attacker know what technology and/or software version is being used in the website), missing header keys (e.g., Clickjacking protection, X-XSS protection or missing X-Content-Type-Options), missing security headers (e.g. X-Frame-Options, Strict-Transport-Security, etc.), unexpected headers that may disclose sensitive information, etc.

As shown in 510 and 518, in another type of scan, process 500 can perform a robots.txt inspection to learn more about the medium level software stack in some embodiments. In some embodiments, this inspection can identify content management systems (CMSs) used such as WordPress™, Joomla™, etc. At the same time, the scan can also look for unprotected paths that may be considered a security risk, such as admin panels that can be discovered by search engine robots in some embodiments.

As shown in 512 and 520, in still another type of scan, process 500 can perform a page metadata inspection that attempts to identify content management systems (CMSs) and if possible, the version being used, as well as other plugins that may be associated with the CMSs in some embodiments. For example, WordPress 4.7 ™ may be identified along with a social media plugin in some embodiments. In some embodiments, this can be achieved by inspecting the HTML metadata present in the header of the HTML.

As shown in 514 and 522, in yet another type of scan, process 500 can perform a referenced scripts inspection that attempts to identify high level software components such as JavaScript libraries being used on top of the CMS framework in some embodiments. In this scan, the process may identify common libraries such as jQuery. These libraries can be detected by inspecting an HTML page on the website, and, if necessary, following the paths of the referenced scripts in the HTML page. In some embodiments, the scan can also be used to identify low integrity content delivery network (CDN) assets and organizations.

After the scans have been completed, at 524, process 500 can combine the findings of the scan into any suitable common data format object, such as a JSON object or a dictionary object. This combining can be performed in any suitable manner in some embodiments.

Turning to FIG. 5B, after 524 is performed, at 528, this common data format object can then be used to determine additional information regarding the scanned websites in some embodiments. For example, in some embodiments, the common data format objected can be used to: (1) infer additional information about the stack of software being used by the website; and (2) complete missing data (e.g. missing software version) regarding the website.

In some embodiments, the additional information can be determined in any suitable manner. For example, in some embodiments, additional information can be determined from one or more content management system (CMS) pattern databases to determine if metadata on the website indicates that a certain CMS is being used and/or if values or the structure of the metadata indicates that a particular version of a CMS is being used. As another example, in some embodiments, additional information can be determined from one or more robots databases that contain common rules used to block/protect paths associated with different CMSs and web frameworks (e.g., after detecting a robot.txt rule on a website, a robots database may be used to determine that website uses WordPress). As yet another example, in some embodiments, additional information can be determined from one or more web application firewall databases which indicate that when certain fingerprints (headers) are found on a website, certain web application firewall solutions are being used. As still another example, in some embodiments, additional information can be determined from one or more host data or "WHOIS" databases to determine that a host of the website is more prone to vulnerability than others.

Next, at 530, process 500 can cross-check the common data format object and additional data against one or more CVE databases to try to find any CVEs associated with components (e.g., the software stack) of the website. The CVE databases can contain information regarding vulnerabilities discovered in software components used in websites and a description of the consequences/impact of each vulnerability being exploited.

Then, at 532, the process can determine whether any CVEs were identified for any software component(s) of the website. If not, process 500 can loop back to 504. Otherwise, process 500 can proceed to 534.

At 534, each CVE can then be evaluated using any suitable rules. For example, in some embodiments, a rule may ignore certain types of vulnerabilities and highly weight other types of vulnerabilities. More particularly for example, file operations may be heavily weighted whereas attacks that only compromise a website with no external impact (e.g. Denial of Service attack) may be ignored.

Next, at 536, process 500 can determine whether the website is potentially a watering hole. This determination can be made on any suitable basis. For example, in some embodiments, a website can be considered to potentially be a watering hole if any CVEs apply to that website that are not identified as to be ignored by a rule.

If it is determined at 536 that a website is not a potential watering hole, then process 500 can loop back to 504. Otherwise, process 500 can proceed to 538.

At 538, process 500 can assign a score to the identified website and add the website to a list of possible watering holes. In some embodiments, the list can be ordered by the score from the most critical (high chances of being used in a watering hole attack) to the less important (low chances of being exploited for a watering hole attack). Any suitable score can be used in some embodiments. For example, in some embodiments, the score for each website can be based on a probability of the website being used as an intermediate target during a watering hole attack. More particularly, for example, in some embodiments, the score for a website can be calculated as:

$$score = cves * swcount * 100,$$

where cves is the number of discovered CVEs for the website and swcount is the number of software components that the website has in its stack—e.g., web server, content management system, javascript, libraries/plugins, etc.). More software in a website's stack implies a bigger attack surface, and more CVEs implies more ways of compromising the website for a watering hole attack. In some embodiments, the score for a website can be calculated as:

$$score = \frac{\left(\sum_{i=1}^{cves} cvew_i\right)}{cves} * \frac{\left(\sum_{j=1}^{swcount} sww_j\right)}{swcount} * 100$$

where $cvew_i$ indicates the severity of CVE i (e.g., $cvew_i$ is high when the severity of CVE i is high and $cvew_i$ is low when the severity of CVE i is low), and $sww_i$ indicates the vulnerability of a software module i (e.g., $sww_i$ is high when the vulnerability of software module i is high and $sww_i$ is low when the vulnerability of a software module i is low).

Then, at 540, process 500 can take any suitable action on the website. For example, in some embodiments, the process can limit the operations that are allowed to be performed on the website (e.g., prohibit file downloads or file uploads or limit website connections, in some embodiments). As another example, in some embodiments, a dedicated proxy channel or gateway can be used to perform a deep scan of the website for a limited time (or until the vulnerabilities in the website are addressed). As yet another example, in some embodiments, a proxy channel or gateway can categorize the website as being suspicious and warn users before accessing the website, or ask users of the website to exercise extra caution when accessing the website. As still another example, in some embodiments, containers and/or sandboxes can be used to render the websites by loading the website on behalf of the user and the presenting a remote view of what is presented to the user. As yet another example, in some embodiments, the website can be blocked until the score decreases in the next scheduled scan. As still another example, in some embodiments, the website can be added to a list of closely monitored/logged objects that a SOC can inspect for hints of suspicious activity (e.g. tracking a lateral movement infection). As yet another example, in some embodiments, past DNS queries related to a website can be evaluated to identify if a recently detected watering hole may have been visited by users before in order to track potential historical activity.

Finally, process 500 can loop back to 504.

Figure 6:
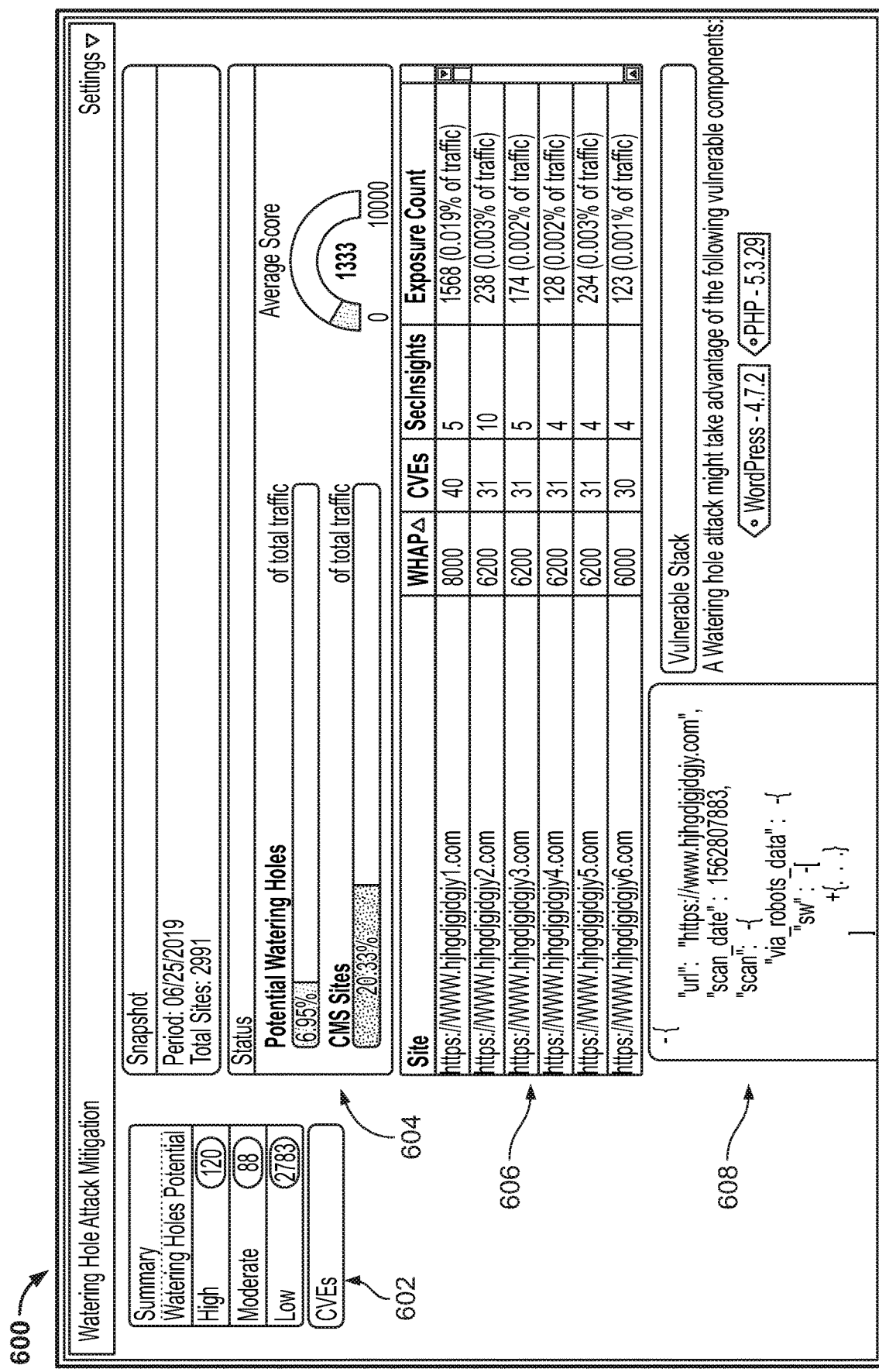
FIG. 6 shows an example of a user interface that can be presented in a security operations center for monitoring possible watering holes in accordance with some embodiments.

FIG. 6 shows an example 600 of a user interface that can be presented in a security operations center for monitoring possible watering holes in accordance with some embodiments. As illustrated, in some embodiments, user interface 600 can include a summary area 602 that indicate a number of websites with a high, a moderate, and a low watering hole potential. In some embodiments, user interface can additionally or alternatively include a status section 604 that indicates the percentage of websites in the total traffic that are potential watering holes, the percentage of websites in the total traffic that are CMSs, and the average value of the score used to indicate the likelihood of a website being a watering hole. In some embodiments, user interface can additionally or alternatively include a list of websites 606, and for each website its score, the number of CVEs associated with the website, the number of risky configurations ("SecInsights") associated with the website, the number of times users have visited the website, and the percentage of traffic that has visited the website. In some embodiments, user interface can additionally or alternatively include a code view window 608 that shows a section of code corresponding to a selected component of a website's software stack.

It should be understood that at least some of the above described blocks of the processes of FIGS. 4, 5A, and 5B can be executed or performed in any order or sequence not limited to the order and sequence shown in and described in the figures. Also, some of the above blocks of the processes of FIGS. 4, 5A, and 5B can be executed or performed substantially simultaneously where appropriate or in parallel to reduce latency and processing times. Additionally or alternatively, some of the above described blocks of the processes of FIGS. 4, 5A, and 5B can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for mitigating damage resulting from a website being an intermediary in a cyberattack, comprising:
    detecting, by a security operations center device, a domain name server query made to a domain name server regarding the website by a user device;
    determining that a certain amount of time has passed since the website has been scanned;
    in response to determining that a certain amount of time has passed since the website has been scanned, making a request to the website by the security operations center device;
    receiving a header in response to the request by the security operations center device;
    inspecting the header to identify a software stack component of the website;
    cross-referencing the software stack component to a common vulnerabilities and exposures (CVE) database to identify a CVE that applies to the software stack component;
    applying a rule to determine the impact of the CVE on whether the website is a possible intermediary in a cyberattack;
    determining that the website is a possible intermediary in a cyberattack; and
    taking action on the website to mitigate damage resulting from the website being an intermediary in a cyberattack.

2. The method of claim 1, wherein the software stack component is one of a web server used by the website, a web framework used by the website, a programming language used by the website, and a web application firewall used by the website.

3. The method of claim 1, further comprising identifying content management systems associated with the website.

4. The method of claim 1, further comprising calculating a score that reflects a probability that the website is a possible intermediary in a cyberattack.

5. The method of claim 1, further comprising limiting operations that can be performed by users on the website.

6. The method of claim 1, further comprising blocking the website.

7. A system for mitigating damage resulting from a website being an intermediary in a cyberattack, comprising:
a security operations center device comprising:
memory; and
a hardware processor coupled to the memory and configured at least to:
detect a domain name server query made to a domain name server regarding the website by a user device;
determine that a certain amount of time has passed since the website has been scanned;
in response to determining that a certain amount of time has passed since the website has been scanned, make a request to the website;
receive a header in response to the request;
inspect the header to identify a software stack component of the website;
cross-reference the software stack component to a common vulnerabilities and exposures (CVE) database to identify a CVE that applies to the software stack component;
apply a rule to determine the impact of the CVE on whether the website is a possible intermediary in a cyberattack;
determine that the website is a possible intermediary in a cyberattack; and
take action on the website to mitigate damage resulting from the website being an intermediary in a cyberattack.

8. The system of claim 7, wherein the software stack component is one of a web server used by the website, a web framework used by the website, a programming language used by the website, and a web application firewall used by the website.

9. The system of claim 7, wherein the hardware processor is further configured to identify content management systems associated with the website.

10. The system of claim 7, wherein the hardware processor is further configured to calculate a score that reflects a probability that the website is a possible intermediary in a cyberattack.

11. The system of claim 7, wherein the hardware processor is further configured to limit operations that can be performed by users on the website.

12. The system of claim 7, wherein the hardware processor is further configured to block the website.

13. A non-transitory computer readable medium containing computer executable instructions that, when executed by a processor, cause the processor to perform a method for mitigating damage resulting from a website being an intermediary in a cyberattack, the method comprising:
detecting, by a security operations center device, a domain name server query made to a domain name server regarding the website by a user device;
determining that a certain amount of time has passed since the website has been scanned;
in response to determining that a certain amount of time has passed since the website has been scanned, making a request to the website by the security operations center device;
receiving a header in response to the request by the security operations center device;
inspecting the header to identify a software stack component of the website;
cross-referencing the software stack component to a common vulnerabilities and exposures (CVE) database to identify a CVE that applies to the software stack component;
applying a rule to determine the impact of the CVE on whether the website is a possible intermediary in a cyberattack;
determining that the website is a possible intermediary in a cyberattack; and
taking action on the website to mitigate damage resulting from the website being an intermediary in a cyberattack.

14. The non-transitory computer readable medium of claim 13, wherein the software stack component is one of a web server used by the website, a web framework used by the website, a programming language used by the website, and a web application firewall used by the website.

15. The non-transitory computer readable medium of claim 13, wherein the method further comprises identifying content management systems associated with the website.

16. The non-transitory computer readable medium of claim 13, wherein the method further comprises calculating a score that reflects a probability that the website is a possible intermediary in a cyberattack.

17. The non-transitory computer readable medium of claim 13, wherein the method further comprises limiting operations that can be performed by users on the website.

18. The non-transitory computer readable medium of claim 13, wherein the method further comprises blocking the website.

* * * * *